R. WHITE.
Revolver.
No. 1,558. Reissued Oct. 27. 1863.
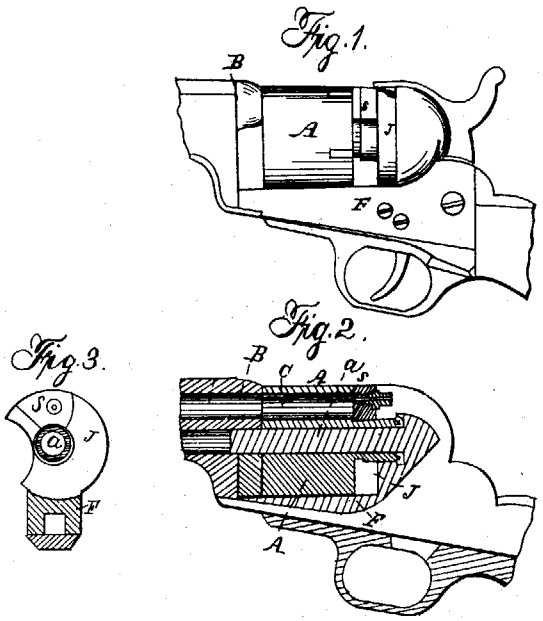
Witnesses.
J. W. Coombs
Geo. W. Reed
Inventor
Rollin White
per Munn & Co
Attorneys

UNITED STATES PATENT OFFICE.

ROLLIN WHITE, OF SPRINGFIELD, MASS., (LATE OF HARTFORD, CONN.)

IMPROVEMENT IN REPEATING FIRE-ARM.

Specification forming part of Letters Patent No. 12,649, dated April 3, 1855; Reissue No. 1,558, dated October 27, 1863.

*To all whom it may concern:*

Be it known that I, ROLLIN WHITE, formerly of the city and county of Hartford, and State of Connecticut, now of Springfield, in the county of Hampden and State of Massachusetts, have invented a new and useful Improvement in Repeating Fire-Arms; and I do hereby declare that the following is a full, clear, and exact description of the same, reference being had to the accompanying drawings, making part of this specification, in which—

Figure 1 is a side view of a pistol on my improved plan. Fig. 2 is a central longitudinal vertical section of the same, and Fig. 3 is a front view of the non-rotating recoil-shield.

Similar letters of reference indicate corresponding parts in the several figures.

This invention consists in the employment of a non-rotating breech or recoil-shield, in combination with a stationary barrel and a rotating cylinder having the chambers extended through its rear, for the purpose of covering the whole or a portion of the rear end of the cylinder, to prevent the charges or cartridge-cases from slipping out from the chambers in a rearward direction, and to form an abutment to resist the force of the discharges; and this invention also consists in combining with a stationary barrel a rotating many-chambered cylinder the chambers of which are of a cylindrical form and extend entirely through such cylinder.

To enable others skilled in the art to make and use my invention, I will proceed to describe its construction and operation.

A is the cylinder, having its chambers *c c* bored longitudinally through it and rotating on a central pin or axle, *a*, to present the chambers *c c* in succession opposite to and in line with the stationary barrel B, the said central pin being suitably secured to the frame F of the arm.

Behind the cylinder there is a non-rotating shield, J, which may be separate from and attached to or made a part of the frame of the arm. This recoil-shield may extend so as to cover the whole or a part of the rear end of the cylinder.

The portion S of the face of the recoil-shield which is behind that chamber which happens to be in line with the barrel I prefer to have project forward of the other portion or portions. The purpose of this recoil-shield is to act as an abutment to the cylinder, or each of the chambers thereof, as they are successively brought in line with the barrel to resist the force of the discharge, and also to prevent the charges or cartridges from dropping out of the chambers of the cylinder.

The cylinder is represented as having cylindrical chambers; but it is obvious that the non-rotating recoil-shield or breech is applicable in connection with cylinders having chambers of various forms with openings in their rear ends, so that the charges or cartridges can come in contact with the recoil-shield or breech when loaded or during the discharge.

What I claim as my invention, and desire to secure by Letters Patent, is—

1. The non-rotating breech or recoil-shield, in combination with a stationary barrel and a revolving cylinder having its chambers extending through the rear end thereof, substantially as and for the purpose herein described.

2. I also claim the rotating cylinder having cylindrically-formed chambers extending entirely through it, in combination with a stationary barrel, substantially as herein described.

ROLLIN WHITE.

Witnesses:
WM. K. BAKER,
J. M. COOLEY.